United States Patent [19]

Ichinokawa

[11] Patent Number: 5,153,607
[45] Date of Patent: Oct. 6, 1992

[54] LASER SHUTTER MECHANISM
[75] Inventor: Kazuhiro Ichinokawa, Tokyo, Japan
[73] Assignee: Asahi Kogaku Kogyo Kabushiki Kaisha, Tokyo, Japan
[21] Appl. No.: 426,025
[22] Filed: Oct. 24, 1989
[30] Foreign Application Priority Data
Oct. 28, 1988 [JP] Japan .................... 63-141419[U]
[51] Int. Cl.⁵ ............................................. H04N 1/21
[52] U.S. Cl. ................................ 346/108; 355/210
[58] Field of Search ............... 346/108, 107 R, 160; 355/1, 211, 210

[56] References Cited
U.S. PATENT DOCUMENTS

| 4,100,419 | 7/1978 | Pedroso | 250/514 |
| 4,588,280 | 5/1986 | Ogawa et al. | 355/211 |
| 4,826,268 | 5/1989 | Kramer | 346/108 |
| 4,943,815 | 7/1990 | Aldrich | 346/108 |

Primary Examiner—Mark J. Reinhart
Attorney, Agent, or Firm—Sandler, Greenblum & Bernstein

[57] ABSTRACT

A laser shutter mechanism is provided and fitted to a window in an optical system container of, e.g., an optical scanning unit in a laser beam printer. The shutter comprises a screen member for preventing the laser beam from emitting through a window to a beam receiving unit. The screen member is movable between its operative and inoperative positions, while it is biased to its operative position wherein it closes the window. An operating member is provided on the beam receiving unit for moving the screen member to its inoperative position where the window is allowed to emit the laser beam therethrough. Only when said beam receiving unit is properly positioned against the window, does the operating member moves the screen member.

10 Claims, 4 Drawing Sheets

LASER SHUTTER MECHANISM

BACKGROUND OF THE INVENTION

The present invention relates to a laser shutter mechanism for use in covering a laser beam emission opening of an optical system container containing an optical system having a laser oscillator.

Conventionally, there is known an image recording device utilizing an electrophotographic system in which a surface of a photoconductive drum is exposed to light to form a latent image on the drum surface. Toner is then applied to the latent image to develop the image, and the developed image is transferred onto a recording sheet and is fixed by a fixing unit. Such an image recording device is chiefly employed in a copying machine. In recent years, however, the image recording device has been used in a Printer or the like for printing output from a computer. One such device is a laser beam printer.

The laser beam printer comprises, for example as illustrated in FIG. 1, a photoconductive drum 1. Arranged about the photoconductive drum 1 in order of the rotational direction thereof are a charging station A, an exposure station B, a developing station C, a transferring station D, a toner-cleaning station E, and a discharge station F.

The arrangement is such that at the exposure station B, the laser beam scans the surface of the drum 1, which has been uniformly charged at the charging station A, to thereby form a latent image on the charged drum surface. Toner is then applied at the developing station C to the latent image to develop the same. Subsequently, the developed toner image is transferred at the transferring station D onto the recording sheet P traveled at a velocity identical with the peripheral speed of the photoconductive drum 1. The recording sheet P carrying the toner image transferred there to at the transfer station D is guided and/or conveyed by guide rollers to a fixing station G. The recording paper P is then heated and/or pressed at the fixing station G for the toner image to be fixed on the surface of the recording sheet P.

The construction of the laser beam printer is substantially similar to that of an electronic copying machine except for the exposure station. In fact, principal parts of the electronic copying machine are often commonly used for conventional laser beam printers.

The electronic copying machine is designed so that an image-carrying surface can instantly be viewed by transferring the toner image onto the top surface of the recording sheet and discharging the recording sheet with the image-carrying side up (so-called "faceup discharging"). This naturally results in the faceup discharging system is employed in laser beam printers having principal parts in common with an electronic copying machine.

However, printers are normally used to print out sheets continuously and, if the sheets are discharged with the image-carrying surfaces up, they will be stacked in inverted order of pages. As a result, it is desirable for the laser beam printers to be able to discharge the sheets with their image-carrying surfaces down (so-called "facedown discharging") so the sheets are stacked in the correct order of pages.

What has been heretofore proposed to overcome the above defect is that an electrophotographic printer having a recording sheet feed path as well a fixing station disposed above a photoconductive drum so that an image may be transferred to the undersurface of the recording sheet before being discharged and stacked. In this case, the exposure unit is substantially disposed under the photoconductive drum.

However, the photoconductive drum has to be replaced after its useful life (in terms of the number of sheets) because the photoconductor on the surface thereof wears thin or because a change in electrostatic characteristics results in defective charging or transfer as the photoconductive drum is repeatedly used.

In the case of the transfer unit conventionally disposed above the photoconductive drum, the exposure unit disposed under the photoconductive drum may be exposed to the outside during the replacement of the photoconductive drum. In case the laser oscillator is accidentally actuated in the aforementioned state, the operator will be directly exposed to the laser beam emitted therefrom and the laser beam directly sent upon the unprotected eyes of the operator poses a serious problem. Even though a switch for electrically detecting the presence of the photoconductive drum is provided to stop the operation of the power supply when the photoconductive drum is removed, the suspension of the operation thereof is not ensured if the switch is out of order.

SUMMARY OF THE INVENTION

It is therefore an object of the invention to provide a laser shutter mechanism capable of screening off a laser beam emission opening of an optical system container containing an optical system having a laser oscillator during replacement of a photoconductive drum in order to shut off a laser beam and prevent the emission thereof even if the laser oscillator operates unintentionally.

In order to accomplish the foregoing object according to the present invention, a laser shutter mechanism for use in covering an opening of an optical system container containing an optical system equipped with a laser oscillator is provided. Through the opening a laser beam is emitted toward a beam receiving unit, which comprises; a screen member for closing the opening to prevent the emission of the laser beam from opening. The screen member is movable between its operative and inoperative positions, and is biased to its operative position when it closes the opening. An operating member is provided in the beam receiving unit to move the screen member to its inoperative position so that the opening is allowed to emit the laser beam therethrough. The operating member moves the screen member only when the beam receiving unit is properly positioned against the opening.

DESCRIPTION OF THE ACCOMPANYING DRAWINGS

DETAILED DESCRIPTION OF THE PREFERRED EMBODIMENT

Figure 1:
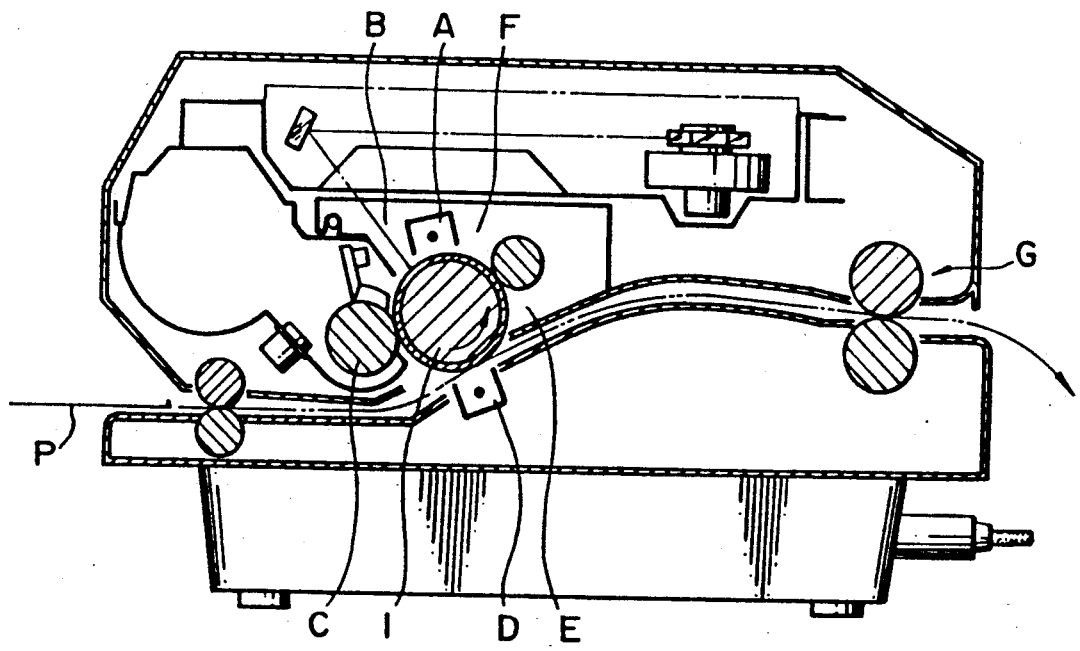
FIG. 1 is a schematic side view illustrating the system configuration of a conventional laser beam printer.
Figure 2:
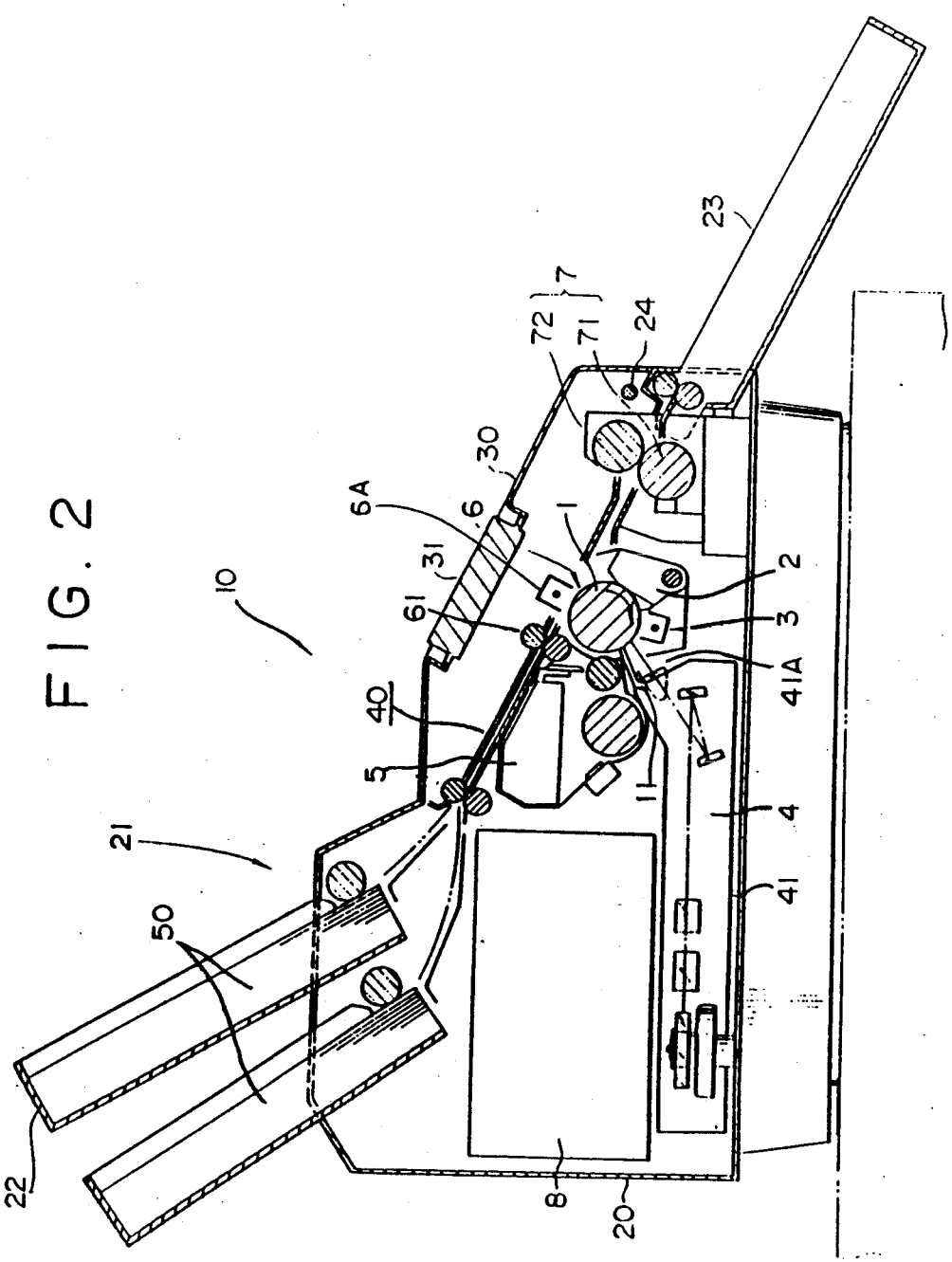
FIG. 2 is a schematic side view illustrating a laser beam printer as an electrophotographic printer equipped with a laser shutter mechanism according to the preferred embodiment of the present invention.

FIG. 2 is a schematic side view illustrating a laser beam printer provided with a laser shutter mechanism as the preferred embodiment of the present invention, this printer being a so-called page printer in which cut sheets are used.

The laser beam printer 10 shown in FIG. 2 looks like a rectangular parallelepiped with its top diagonally cut at a predetermined angle and consists of a body 20 and a clamshell 30.

The uppermost section of the body 20 forms a cassette holding portion 21 to receive a pair of paper cassettes 22, 22 in which papers which are different in size are respectively stored. While printing is being executed, recording paper is sequentially introduced one by one into a paper feed path 40.

A discharge paper tray 23 is provided at the side of the body 20 opposite in the diagonal direction to the cassette holding portion 21.

The clamshell 30 forms an inclined surface portion of the printer 10 and its lower end portion is rockably coupled to the body 20 by means of a pivot shaft 24. On the other hand, the upper end portion of the clamshell 30 is allowed to rock away from the body 20 with the shaft 24 as a fulcrum so that the clamshell 30 is able to open.

A control panel 31 for operating the printer 10 is disposed on the inclined surface of the clamshell 30. The clamshell 30 has substantially the uniform thickness and the paper feed path 40 is directed downward at the substantially same inclination angle as that of the inclined surface of the clamshell 30.

A pair of opposed feed rollers 61 are respectively provided at the undersurface of the clamshell 30 and uppersurface of the body 20, one of which is driven to rotate by a drive means, not shown.

A photoconductive drum 1 is disposed under the substantially central area of the paper feed path 40 in the body 20.

Around the photoconductive drum 1 in the body 20, disposed along the direction of its rotation in the order described below are a cleaning unit 2 for removing toner remaining on the surface of the drum 1, a charging unit 3 for uniformly charging the surface of the drum 1, a laser scanning unit 4 for scanning the charged surface of the drum 1 with a laser beam carrying image data to form a latent image thereon, and a developing unit 5 for putting toner onto the portion of the surface of the drum 1 exposed to the laser beams to develop a toner image. A reference numeral 8 represents a control unit for controlling the operation of the printer 10 including a power source.

On the other hand, a corona charger 6A for charging the recording paper 50 so that the toner image on the drum 1 in transferred thereonto is disposed is the clamshell 30 opposite to the drum 1 with the paper feed path 40 therebetween. The corona charger 6A and the portion of the drum 1 opposed thereto constitute a transfer unit 6.

The photoconductive drum 1 and the developing unit 5 are so-called consumable components and should be exchanged after use for a certain period of time. For this reason, these components are formed to be independently replaceable units, and are movable if the clamshell 30 is tucked upwardly. In other words, the consumable components such as the photoconductive drum 1 and the developing unit 5 which must be exchanged at certain-time intervals can readily be replaced since the clamshell 30 is arranged to be openable upwardly.

These exchangeable components may be arranged to be seated to their respective positions by downward closure of the clamshell 30. More specifically, instead of employing securing members for the exchangeable components, contacting portions formed at the undersurface of the clamshell 30, may be used to press down the core bars of the drum 1 at both lateral ends and/or the upper surface of the developing unit 5 in order to prevent these components from lifting out of their respective positions and from changing their relative positions as the drum 1 and the developing drum in the developing unit 5 are rotated. With this arrangement, securing members for respective components can be dispensed with, whereby not only cost reduction but also convenience in maintenance can be attained.

A fixing unit 7 is arranged down stream of the transfer unit 7 along the paper feed path 40. The fixing unit 7 comprises a heat roll 71 and a backup roll 72 opposedly disposed with and defining the paper feed path 40 therebetween. The recording paper 50 carrying the unfixed toner image is nipped between the rolls 71, 72 and the toner is fixed onto the recording paper 50 by heat and pressure applied by the heat roll 71. A drive motor, not shown, is employed to rotate the heat roll 71 to feed the recording paper 50 in the fixing unit 7.

The laser beam printer thus constructed operates as follows:

Recording paper 50 stored in any one of the paper cassettes 22, 22 fitted to the cassette holding portion 21 of the body 20 are drawn out one by one into the paper feed path 40. The recording paper 50 thus introduced into the paper feed path 40 is fed by the feed rollers 61. The toner image formed on the surface of the photoconductive drum 1 is transferred to the undersurface of the recording paper 50 at the transfer unit 6. The toner image transferred onto the undersurface of the recording paper 50 is fixed by the fixing unit 7, and the recording paper 50 is then discharged onto the discharge paper tray 23 with its image-carrying side down (i.e. in face-down state).

The laser scanning unit 4 comprising optical elements including a semiconductor laser for generating a laser beam and a polygon mirror for reflecting the laser beam for use in scanning is contained in a housing 41 serving as an optical system container.

The laser beam from the semiconductor laser is emitted through a window 41A acting as a laser beam emission opening formed a position in the housing 41 towards the photoconductive drum 1. A laser shutter mechanism embodying the present invention is fitted to the window 41A.

Figure 3:
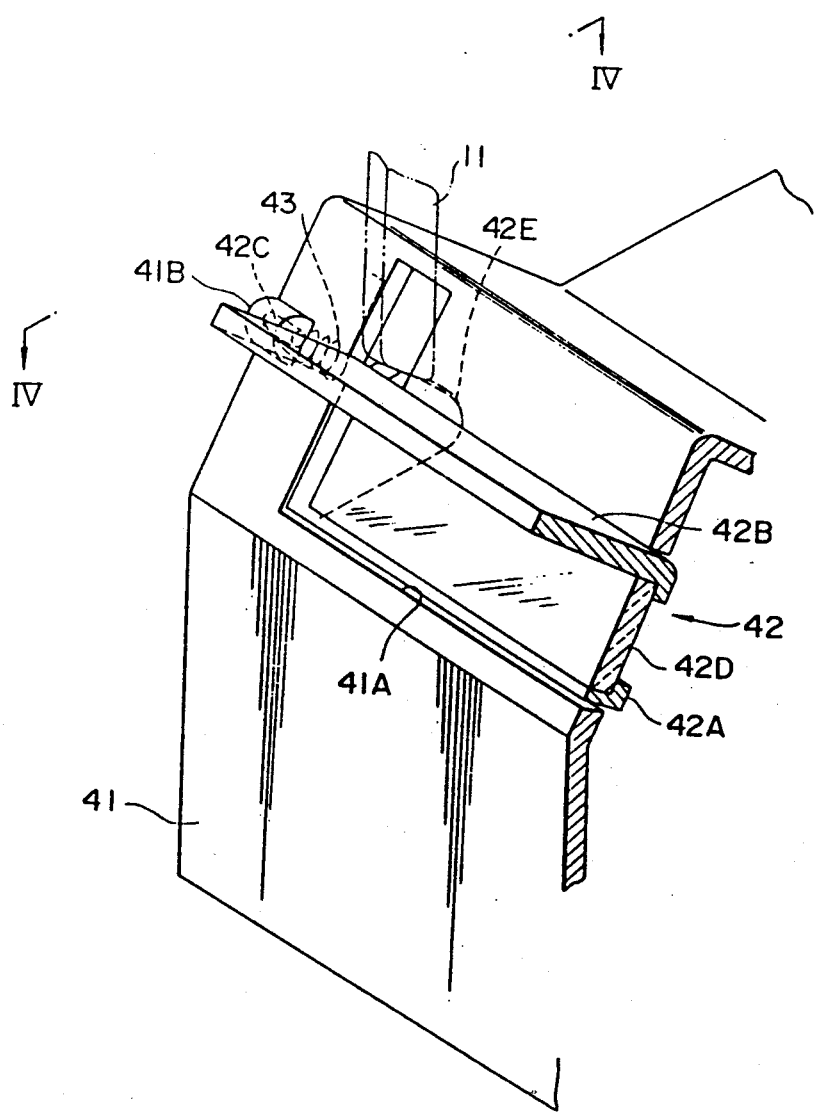
FIG. 3 is an enlarged perspective sectional view of the laser shutter mechanism.

FIG. 3 is an enlarged perspective view of the periphery of the window 41A on the housing 41.

The housing 41 comprises the rectangular window 41A opened in parallel and opposite to the photoconductive drum 1 and a shutter 42 acting as a shutter member fitted to the window 41A.

The shutter 42 comprises a sash 42A and a shutter plate 42B combined perpendicularly at one end of each and is L-shaped in section. Moreover, rocking projections 42E extend from the respective ends of the sash 42A.

The sash 42A has an external configuration which allows it to be precisely fitted into the window 41A and is fitted with dustproof glass 42D acting as a transparent window member within its frame. When the sash 42A is located within the window 41A, the laser beam can be emitted out of the unit box 41 through the dustproof glass 42D as it can pass through the dustproof glass 42D.

The shutter plate 42B is formed with a member incapable of transmitting the beam and large enough to cover the window 41A (i.e. larger than the window 41A) at a predetermined thickness.

The rocking projections 42E formed at the predetermined thickness project from both the respective ends of the sash 42A in the direction opposite to the shutter 42B. The upper end face of each rocking projection has a predetermined slant and, when an operating projection 11 of the photoconductive drum 1 presses the upper end face, the shutter 42 is driven to rotate.

The shutter 42 has a shaft 42C projecting outwardly from the junction of the sash 42A and the shutter plate 42B, the shaft being slidably rotatably mated with a boss 41B projecting from a predetermined position on the outer face of the unit box 41. As the shaft 42C rotates, the sash 42A or shutter plate 42B is set in position in the window 41A.

Figure 4A:
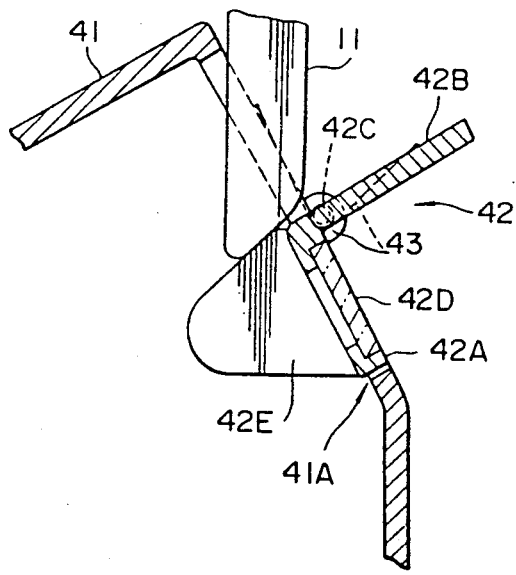
FIG. 4A is a sectional view illustrating the photoconductive drum fitted in position.
Figure 4B:
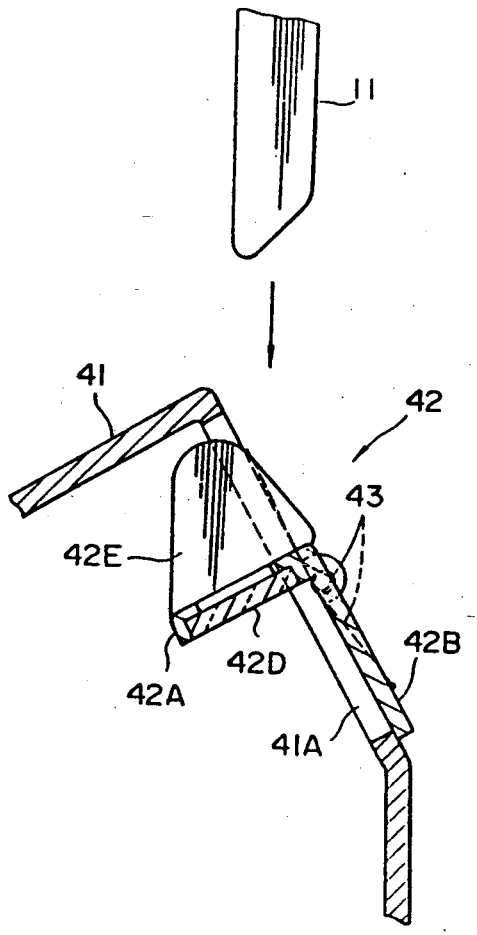
FIG. 4B is a sectional view of the printer without the photoconductive drum.

Both end extensions of a torsion spring 43 wound on the outer periphery of the shaft 42C respectively mate with the outer face of the unit box 41 and the back surface of the shutter plate 42B, whereby the torsion spring 43 rotatably biases the shutter 42 as shown in FIG. 4B in such a manner that the shutter plate 42B covers the window 41A. In other words, the window 41A is completely screened by the shutter plate 42B in the natural state (i.e. in the state in which no external force is exerted).

More specifically, the rocking projection 42E is freed of the pressure applied by each operating projection 11 while the photoconductive drum 1 is not installed in position above the optical scanning system 4 and consequently the window 41A is completely screened by the shutter plate 42B. The laser beam, thus screened by the shutter plate 42B, is therefore prevented from being emitted from the unit box 41 even if the semiconductor laser is actuated to oscillate.

When the photoconductive drum 1 is set in position above the optical scanning system 4, the operating projections 11 on both respective sides of the photoconductive drum 1 abut against and press the surfaces of the rocking projections to rotate the shutter 42 against the bias force of the torsion spring 43. The sash 42A is thus located in the window 41A as shown in FIG. 4A. In this state, the laser beam is allowed to pass through the dustproof glass 42D for emission. Incidentally, the shutter 42B projects upwardly to cover the upper side of the sash 42A at this time so as to prevent toner from the developing unit 5 located above the unit box 41 from falling on the dustproof glass 42D.

The laser shutter mechanism thus arranged has the window 41A of the unit box 41 screened by the shutter plate 42B while the photoconductive drum 1 is not installed and, even if the built-in semiconductor laser is actuated to oscillate, the laser beam is prevented from being emitted from the housing or unit box 41. The photoconductive drum 1 can thus be removed and replaced with safety.

As set forth above, the laser emission opening of the optical system container is automatically screened when the photoconductive drum is removed according to the present invention, whereas even if the laser oscillator is operated, the laser beam is prevented from being emitted to provide a so-called fail-safe construction.

Accordingly, maintenance work including the replacement of the photoconductive drum can be done with safety.

What is claimed is:

1. A laser shutter mechanism for use in covering an opening of an optical system container containing an optical system equipped with a laser oscillator, a laser beam being emitted upwardly through said opening towards a beam receiving unit, said beam receiving unit being positioned above said optical system container, said mechanism comprising:

a screen member positioned externally of said container for closing said opening to prevent the emission of the laser beam from said opening, said screen member being movable between operative and inoperative positions, said screen member being biased to the operative position in which said screen member closes said opening; and an operating member provided with said beam receiving unit for moving said screen member to the inoperative position where said opening is allowed to admit the laser beam therethrough, said operating member moving said screen member only when said beam receiving unit is properly positioned adjacent said opening.

2. The laser shutter mechanism according to claim 1, wherein said screen member comprises a light-shielding screen plate large enough to cover said opening, said screen plate being held by a pivot shaft rotatably supported by said container, said pivot shaft being biased by a spring member to hold said screen plate at its operative position.

3. The laser shutter mechanism according to claim 2, wherein said pivot shaft is provided with a contact member; and wherein said operating member contacts said contact member to rotate said shaft to bring and hold said screen plate in its operating position.

4. The laser shutter mechanism according to claim 3, wherein said screen member comprises a plate member having a substantially L-shaped sectional shape having two arm plates, one arm plate of said plate member constituting said light shielding screen plate while the other arm plate constitutes a transparent cover plate which covers said opening when said screen plate is at its inoperative position.

5. The laser shutter mechanism according to claim 4, wherein said transparent plate is provided with a projection which constitutes said contact member.

6. A laser beam printer comprising an exchangeable photoconductive unit and a laser scanning unit, both of said units being housed in a body frame, said photoconductive unit being positioned above said laser scanning unit, said laser scanning unit being provided with an opening through which a laser bean is emitted upwardly towards said photoconductive unit, and a laser shutter mechanism for preventing emission of the laser beam through said opening, said laser shutter mechanism comprising:

a screen member positioned externally of said laser scanning unit for closing said opening to prevent the emission of the laser beam from said opening, said screen member being movable between operative and inoperative positions, while said screen member is biased to the operative position where it closes said opening; and an operating member provided with said photoconductive unit for moving said screen member to the inoperative position wherein said opening is allowed to emit the laser beam therethrough, said operating member moving said screen member only when said photoconductive unit is properly positioned adjacent said opening.

7. The laser shutter mechanism according to claim 1, further comprising a transparent member adapted to cover said opening.

8. The laser beam printer according to claim 6, further comprising a transparent member adapted to cover said opening.

9. The laser shutter mechanism according to claim 7, wherein said transparent member is pivotably mounted.

10. The laser beam printer according to claim 8, wherein said transparent member is pivotably mounted.

* * * * *

UNITED STATES PATENT AND TRADEMARK OFFICE
CERTIFICATE OF CORRECTION

PATENT NO. : 5,153,607
DATED : October 6, 1992
INVENTOR(S) : K. ICHINOKAWA

It is certified that error appears in the above-indentified patent and that said Letters Patent is hereby corrected as shown below:

At column 6, line 57 (claim 6, line 6), change "bean" to ---beam---.

Signed and Sealed this

Twenty-ninth Day of October 1996

Attest:

BRUCE LEHMAN

Attesting Officer      Commissioner of Patents and Trademarks